United States Patent
Matthews

(10) Patent No.: US 7,760,524 B2
(45) Date of Patent: Jul. 20, 2010

(54) METHOD AND APPARATUS TO REDUCE THE VOLUME REQUIRED FOR BULK CAPACITANCE IN A POWER SUPPLY

(75) Inventor: David Michael Hugh Matthews, Windsor (GB)

(73) Assignee: Power Integrations, Inc., San Jose, CA (US)

( * ) Notice: Subject to any disclaimer, the term of this patent is extended or adjusted under 35 U.S.C. 154(b) by 178 days.

(21) Appl. No.: 11/873,697

(22) Filed: Oct. 17, 2007

(65) Prior Publication Data

US 2009/0103337 A1  Apr. 23, 2009

(51) Int. Cl.
*H02M 1/15* (2006.01)
(52) U.S. Cl. .................. 363/46; 363/45; 363/53
(58) Field of Classification Search .......... 363/44–46, 363/52, 53, 89, 126
See application file for complete search history.

(56) References Cited

U.S. PATENT DOCUMENTS

| | | | |
|---|---|---|---|
| 4,622,474 A * | 11/1986 | Christl et al. ............... | 307/105 |
| 4,668,921 A * | 5/1987 | Tamura ...................... | 330/297 |
| 5,394,017 A | 2/1995 | Catano et al. | |
| 5,563,758 A | 10/1996 | Dembrosky et al. | |
| 5,673,185 A * | 9/1997 | Albach et al. ................ | 363/45 |
| 5,798,914 A * | 8/1998 | Wuidart et al. ............... | 363/44 |
| 5,825,639 A * | 10/1998 | Wagoner ..................... | 363/39 |
| 5,999,429 A | 12/1999 | Brown | |
| 6,043,705 A | 3/2000 | Jiang | |
| 6,504,497 B2 | 1/2003 | Jang et al. | |
| 6,538,906 B1 | 3/2003 | Ke et al. | |
| 6,738,277 B2 | 5/2004 | Odell | |
| 6,788,040 B2 | 9/2004 | Lubomirsky | |
| 6,879,140 B2 | 4/2005 | Elkin et al. | |
| 6,882,212 B2 | 4/2005 | Balakrishnan | |
| 7,061,212 B2 | 6/2006 | Phadke | |
| 7,061,301 B2 | 6/2006 | Pham | |
| 2007/0236848 A1 | 10/2007 | Mayell | |

OTHER PUBLICATIONS

TL431, TL431A, TL431B, TL432, TL432A, TL432B Adjustable Precision Shunt Regulators, Texas Instruments, SLVS543J—Aug. 2004—Revised Dec. 2005.
U.S. Appl. No. 11/485,657, filed Jul. 12, 2006, David Michael Hugh Matthews.

* cited by examiner

*Primary Examiner*—Jeffrey L Sterrett
*Assistant Examiner*—Fred E Finch, III
(74) *Attorney, Agent, or Firm*—Blakely Sokoloff Taylor & Zafman, LLP

(57) ABSTRACT

A driver circuit included in a power supply having a rectifier coupled to a single phase AC input voltage is disclosed. An example driver circuit includes a drive signal generator to generate a drive signal to be coupled to a variable impedance element. A voltage sensor is coupled to the drive signal generator and is to be coupled to sense a voltage across a high voltage capacitance. The driver circuit is to be coupled to control the variable impedance element in response to the voltage sensor. A low voltage capacitance is allowed to receive current from the input if the sensed voltage is less than a second threshold value. The low voltage capacitance is prevented from receiving current from the input if the sensed voltage is greater than a first threshold value.

25 Claims, 6 Drawing Sheets

METHOD AND APPARATUS TO REDUCE THE VOLUME REQUIRED FOR BULK CAPACITANCE IN A POWER SUPPLY

BACKGROUND INFORMATION

1. Field of the Disclosure

The present invention relates generally to energy storage circuits, and more specifically, the invention relates to circuits that use capacitors to store energy in power supplies connected to single phase AC power sources.

2. Background

Known AC-to-DC power supplies typically have three principal groups of circuits that perform distinct functions: input rectification, bulk energy storage, and DC-to-DC conversion. The circuits that perform input rectification change bidirectional current from a single phase AC power line into rectified input current that flows in only one direction. The bulk energy storage function is typically performed by one or more capacitors that form what is often referred to as bulk capacitance. The bulk capacitance receives the rectified input current, using it to store energy in the form of a voltage on one or more capacitors. The voltage on the bulk capacitance is usually too high in magnitude and not steady enough to power the delicate circuits in electronic equipment. Therefore, a DC-to-DC conversion function changes the rectified voltage from the bulk capacitance into a more suitable form at the output of the power supply. The DC-to-DC converter is usually one of many well-known switching power converter circuits that can produce the desired output with high efficiency.

The rectified voltage on a bulk capacitor typically varies between a peak value and a valley value at a frequency that depends on the type of rectification and the frequency of the AC power line. The peak is typically the voltage at the peak of a cycle of AC input voltage. The valley is determined by the amount of capacitance and by the amount of power demanded by the DC-to-DC converter. The difference between the peak and the valley is the ripple voltage. It is important that the ripple voltage does not get too large at the minimum AC input voltage specified for the power supply because the DC-to-DC converter needs a minimum rectified voltage at its input to produce the desired output.

An additional concern is the value of the valley voltage when the voltage from the AC power line is removed. The power supply is typically required to provide its normal output for a short time after the AC input voltage is removed so that the electronic circuits that receive power from the power supply can perform necessary tasks before the electronic circuits lose power. The amount of time the power supply continues to operate after the AC input is removed is referred to as holdup time. During the holdup time, the DC-to-DC converter must get all its energy from the bulk capacitance. The energy available from the bulk capacitance is proportional to the value of the capacitance and to the square of the voltage on the capacitance.

The capacitors that make up the bulk capacitance are selected to meet several requirements that are influenced by the intended use of the power supply. The physical size of the power supply is strongly influenced by the value and the voltage rating (the maximum voltage that an individual capacitor can reliably withstand) of the capacitors that are part of the bulk capacitance. The cost of the bulk capacitance is also a significant part of the cost of the power supply. For a given value of capacitance, a higher voltage rating translates to higher cost.

The voltage rating is selected for reliable operation at the maximum AC input voltage of the power supply, whereas the capacitance of individual capacitors is selected based on the minimum specified AC input voltage of the power supply. The total bulk capacitance value must be selected to ensure the minimum input voltage required for the DC-to-DC converter is not reached when the power supply is operating from the minimum specified AC input voltage.

Known AC-to-DC power supplies designed to operate from a wide range of AC input voltage (typically between 85 volts AC and 265 volts AC) therefore require physically large capacitors due to the high capacitance values demanded by the minimum AC input voltage combined with very high voltage ratings demanded by the maximum AC input voltage.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Examples related to reducing the volume required for bulk capacitance in a power supply in accordance with the present invention are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example" or "an example" means that a particular feature, structure or characteristic described in connection with the embodiment is included in at least one embodiment or example of the present invention. Thus, the appearances of the phrases "in one embodiment," "in an embodiment," "in one example" or "in an example" in various places throughout this specification are not necessarily all referring to the same embodiment. The particular features, structures or characteristics may be combined for example into any suitable combinations and/or sub-combinations in one or more embodiments or examples. Furthermore, the particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As will be discussed, teachings in accordance with present invention are directed to the use of capacitors to store energy in AC-to-DC power supplies. In particular, low cost solutions are described that reduce the physical volume that is occupied by the capacitors that are required to allow a power supply to operate across a specified range of input voltage.

Figure 1:
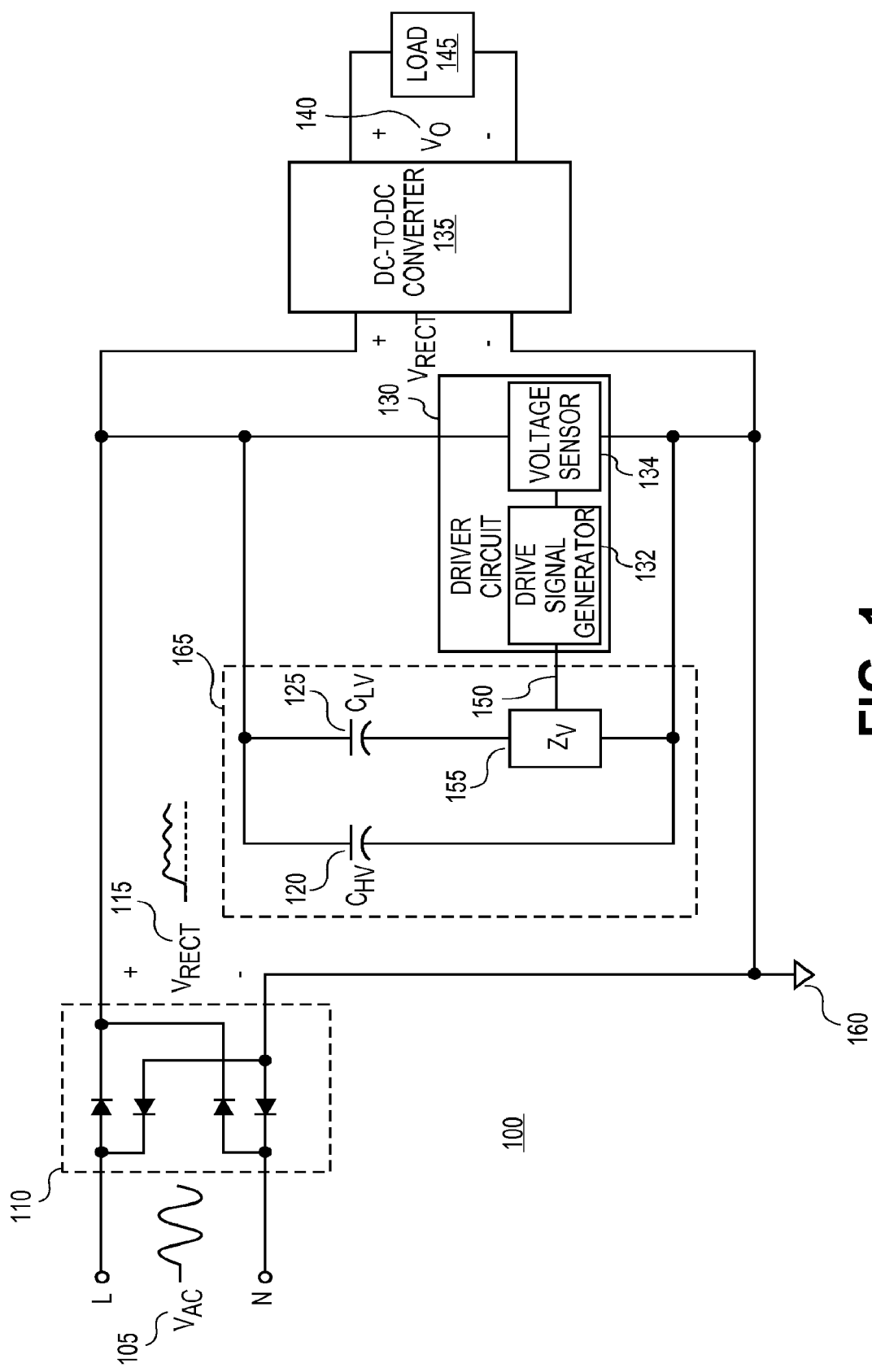
FIG. 1 is a functional block diagram of an example AC-to-DC power supply 100 that illustrates salient features in accordance with the teachings of the present invention.

To illustrate, FIG. 1 shows a functional block diagram of an example AC-to-DC power supply 100 that illustrates salient features in accordance with the teachings of the present invention. As shown, a full wave bridge rectifier 110 is coupled to receive a single phase AC input voltage 105. An energy storage circuit 165 receives current from the bridge rectifier 110 to produce a rectified voltage $V_{RECT}$ 115 that is a positive voltage with respect to a common input return 160. A DC-to-DC converter 135 receives the rectified voltage $V_{RECT}$ 115 to produce an output voltage $V_O$ 140 at a load 145.

As shown in the depicted example, an energy storage circuit 165 includes a high voltage capacitance $C_{HV}$ 120, which is coupled to receive a current from rectifier 110 to produce the rectified voltage $V_{RECT}$ 115 across the high voltage capacitance $C_{HV}$ 120. As shown, a low voltage capacitance $C_{LV}$ 125 is coupled to the high voltage capacitance $C_{HV}$ 120 and a variable impedance element $Z_V$ 155 is coupled to the low voltage capacitance $C_{LV}$ 125 and the high voltage capacitance $C_{HV}$ 120.

As will be discussed in greater detail below, a driver circuit 130 includes a drive signal generator 132 coupled to generate a drive signal 150 in response to a voltage sensor 134 coupled to sense rectified voltage $V_{RECT}$ 115. The drive signal 150 is coupled to control the variable impedance element $Z_V$ 155 in response to the rectified voltage $V_{RECT}$ 115 such that variable impedance element $Z_V$ 155 allows the low voltage capacitance $C_{LV}$ 125 to receive the current from a rectifier 110 if the rectified voltage $V_{RECT}$ 115 is less than a second threshold value. If the rectified voltage $V_{RECT}$ 115 is greater than a first threshold value, the variable impedance element $Z_V$ 155 is coupled to prevent low voltage capacitance $C_{LV}$ 125 from receiving the current from a rectifier 110. In one example, the first threshold value is substantially equal to the second threshold value. In another example, the first threshold value is greater than the second threshold value.

To illustrate, the example in FIG. 1 shows that the energy storage circuit 165 includes small capacitance $C_{HV}$ 120 that has a high voltage rating and large capacitance $C_{LV}$ 125 that has a substantially lower voltage rating. In one example, the ratio of the voltage ratings of $C_{HV}$ and $C_{LV}$ is equal to or greater than 2:1. Energy storage circuit 165 also includes variable impedance element $Z_V$ 155 whose impedance is responsive to a drive signal 150 from drive signal generator 132 of driver circuit 130 that responds to the magnitude of rectified voltage $V_{RECT}$ 115 as sensed by voltage sensor 134.

In the example, one terminal of the low voltage capacitance $C_{LV}$ 125 in the energy storage circuit 165 is coupled to the rectified voltage $V_{RECT}$ 115. The other terminal of the low voltage capacitance $C_{LV}$ 125 in the energy storage circuit 165 is coupled to the variable impedance element $Z_V$ 155. The variable impedance element $Z_V$ 155 in the energy storage circuit 165 is coupled between the low voltage capacitance $C_{LV}$ 125 and the common input return 160. Therefore, the low voltage capacitance $C_{LV}$ 125 is sometimes referred to as a high-side component, whereas the variable impedance element $Z_V$ is sometimes referred to as a low-side component.

In one example, the variable impedance element $Z_V$ 155 may change from very high impedance to very low impedance in response to the drive signal 150. In the example, a very high impedance of the variable impedance element $Z_V$ 155 is effectively an open switch. An open switch is one that cannot conduct current. A very low impedance of the variable impedance element $Z_V$ 155 is effectively a closed switch. A closed switch is one that may conduct current. A closed switch typically also has low voltage between its conducting terminals when it is conducting current. In one example, the voltage between conducting terminals of a closed switch is 10% or less of the value of the rectified voltage $V_{RECT}$ 115. In one example, the variable impedance element $Z_V$ 155 may, also have an intermediate value of impedance that is neither very high nor very low in response to a value of the drive signal 150.

As will be discussed in further detail below, the variable impedance element $Z_V$ 155 and driver circuit 130 in one example allow the low voltage capacitance $C_{LV}$ 125 to receive current from rectifier 110 only when the rectified voltage $V_{RECT}$ 115 is less than a threshold value that does not exceed the voltage rating of low voltage capacitance $C_{LV}$ 125. Thus, when the single phase AC input voltage 105 is high enough so that only a small capacitance is required to keep the valley of the rectified voltage $V_{RECT}$ 115 from going below its minimum desired value, only the small capacitance $C_{HV}$ 120 with high voltage rating in the energy storage circuit 165 is allowed to receive current from the bridge rectifier 110. When the AC input voltage is low enough to require a large capacitance to keep the valley of the rectified voltage $V_{RECT}$ 115 from going below its minimum desired value, both the small capacitance $C_{HV}$ 120 with high voltage rating and the large capacitance $C_{LV}$ 125 with low voltage rating in the energy storage circuit are allowed to receive current from the bridge rectifier 110. In other examples, it is noted that each of the capacitances $C_{HV}$ 120 and $C_{LV}$ 125 may be realized by one or more of individual capacitors.

Figure 2:
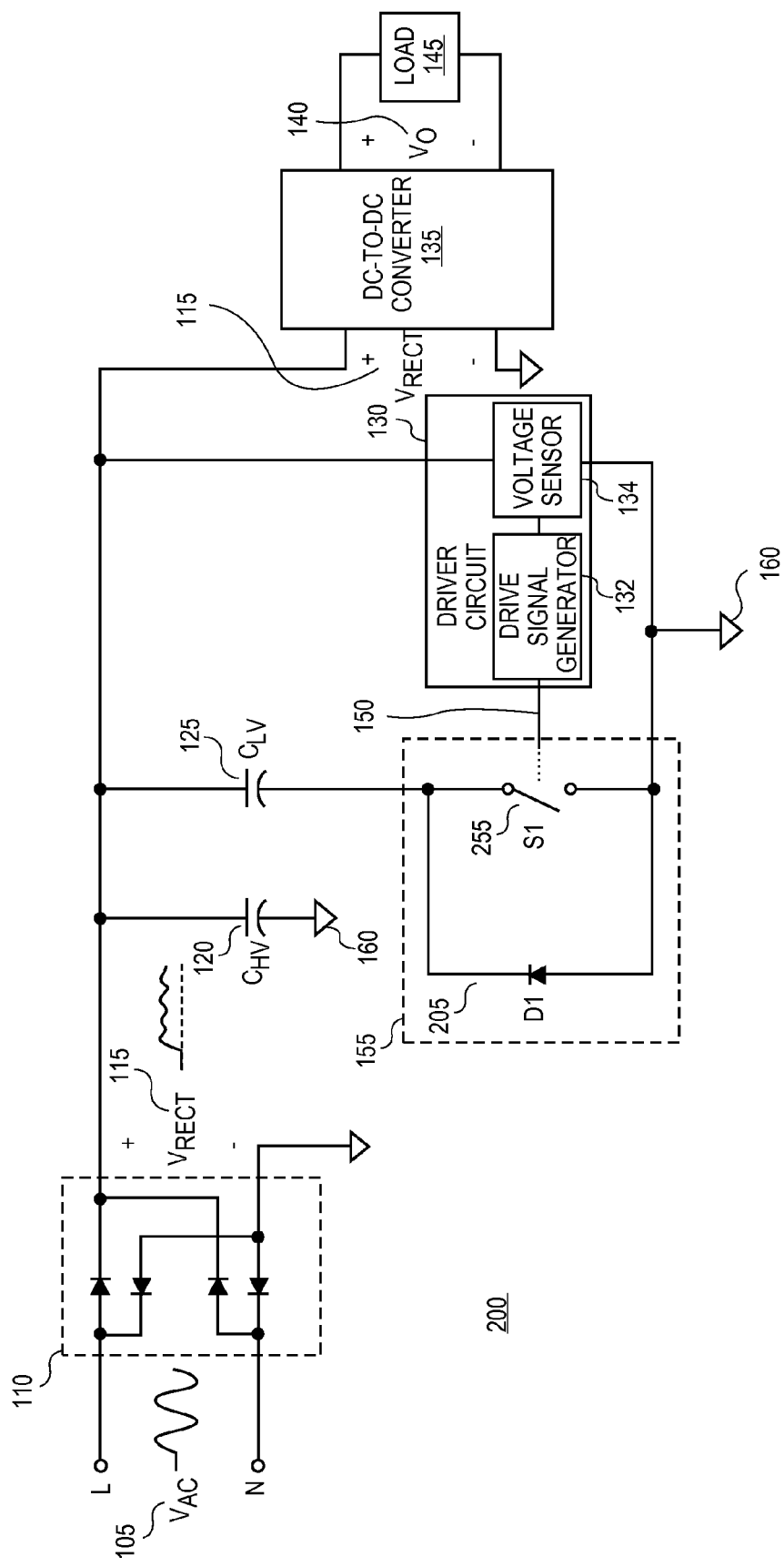
FIG. 2 gives an example of a variable impedance element that engages and disengages a capacitance in an energy storage circuit of an example power supply in accordance with the teachings of the present invention.

FIG. 2 shows an example with a variable impedance element 155 that engages and disengages a capacitance 125 in an energy storage circuit of an example power supply 200 in accordance with the teachings of the present invention. In one example, variable impedance element 155 may be very high impedance in only one direction as illustrated in the example AC-to-DC power supply 200. As shown, the drive signal 150 from drive signal generator 132 of driver circuit 130 may open or close the switch S1 255 in the variable impedance element 155. The diode D1 205 in the variable impedance element 155, which is coupled to low voltage capacitance $C_{LV}$ 125 and high voltage capacitance $C_{HV}$ 120 through common input return 160 as shown, allows current to pass through the variable impedance element 155 in one direction even when switch S1 255 is open. In the example of FIG. 2, the low voltage capacitance $C_{LV}$ 125 cannot charge when the switch S1 255 is open, although the low voltage capacitance $C_{LV}$ 125 can discharge when the switch S1 255 is either open or closed.

Figure 3:
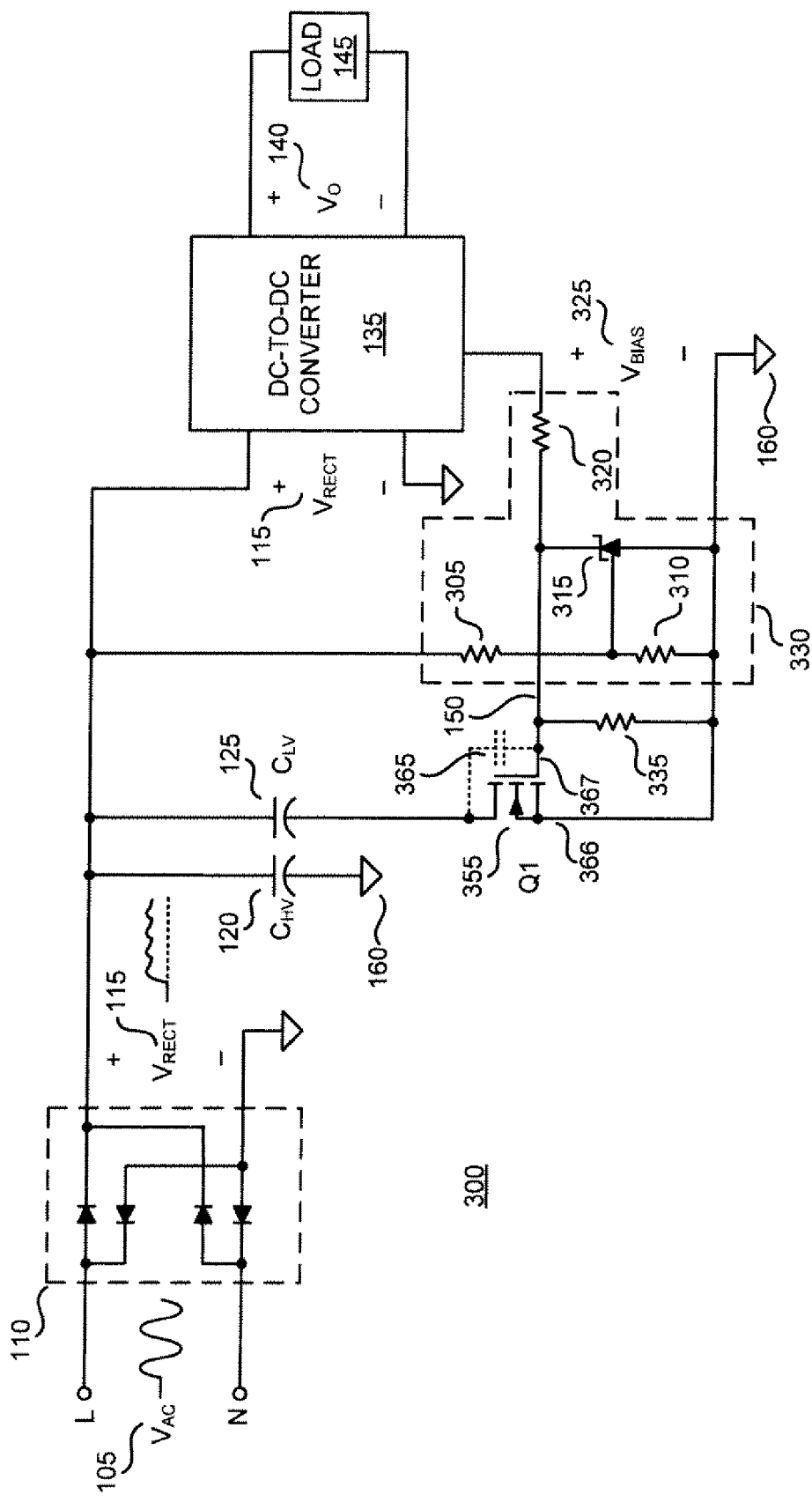
FIG. 3 is an example power supply that includes a transistor and a three terminal shunt regulator to engage and disengage a capacitance in an energy storage circuit of an example power supply in accordance with the teachings of the present invention.

FIG. 3 is an example power supply 300 that includes a transistor 355 and a three terminal shunt regulator 315 coupled to engage and disengage capacitance 125 in an energy storage circuit of the example power supply 300 in accordance with the teachings of the present invention. In one example, the three terminal shunt regulator 315 of a driver circuit 330 is a TL431 regulator. A resistor 320 of the driver circuit 330 receives at one end a bias voltage $V_{BIAS}$ 325 from the DC-to-DC converter 135. The three terminal shunt regulator 315 draws current from the resistor 320 to change the voltage of drive signal 150.

As shown in the depicted example, a voltage divider including a first resistor 305 and a second resistor 340 is coupled to sense the rectified voltage $V_{RECT}$ 115 and set a threshold voltage. In one example, the drive signal 150 goes low when the rectified voltage $V_{RECT}$ 115 is greater than the threshold voltage. The drive signal 150 goes high when the rectified voltage $V_{RECT}$ 115 less than the threshold voltage.

In the illustrated example, a transistor Q1 355 is coupled to receive the drive signal 150 to perform the function of the variable impedance element 155 in the example of FIG. 2. The transistor Q1 355 is a metal oxide semiconductor field effect transistor (MOSFET) in the example energy storage circuit illustrated in FIG. 3. The transistor Q1 355 is off when the rectified voltage $V_{RECT}$ is greater than the threshold voltage. The transistor Q1 355 is on when the rectified voltage $V_{RECT}$ 115 is less than the threshold voltage. In one example this condition could exist when the single phase AC supply voltage 105 is below a value that allows the valley voltage of rectified voltage 115 to drop below the threshold voltage or during a temporary hold up condition. A resistor 335 between the gate 367 and source 366 of transistor Q1 355 assures that transistor Q1 355 turns off if drive signal 150 is lost, for example if there is a fault with driver circuit 330 or $V_{BIAS}$ 325 is lost. It is appreciated that if the single phase AC input voltage $V_{AC}$ 105 is removed, power supply 300 will no longer be able to operate beyond a short hold up time. In one example a typical hold up time requirement is 10 milliseconds.

In another example, hysteresis is introduced in the driver circuit 330 at establish an upper threshold voltage that is greater than a lower threshold voltage. The hysteresis gives the circuit a degree of immunity to noise. With hysteresis, the rectified voltage $V_{RECT}$ must be above the upper threshold for the transistor Q1 355 to change from on to off, and the rectified voltage $V_{RECT}$ must be below the lower threshold voltage for the transistor Q1 355 to change from off to on.

In yet another example, the driver circuit 330 is coupled to limit the current in the transistor Q1 355 to be less than the maximum rated value for the device. In one example, the technique to control current in the transistor measures the current in the transistor. In another example, the technique to control current in the transistor that is coupled to a capacitance limits the rate of change of voltage across the transistor or variable impedance element. In one example, limiting a rate of change of voltage across variable impedance element 355 can be implemented using optional capacitor 365. When variable impedance element 355 is off, a voltage appears across capacitor 365 that is substantially equal to the voltage across variable impedance element 355, due to the presence of resistor 335. When the voltage across variable impedance element 355 falls as it is turned on, the resulting change in voltage across capacitor 365, draws current through resistor 320, increasing the voltage dropped across resistor 320. The voltage appearing between gate terminal 367 and source terminal 366 of the example MOSFET variable impedance element 353 therefore rises more slowly than would be the case if capacitor 365 were not used. The effect of the capacitor 363 is therefore to limit the rate of change of the voltage across variable impedance element 355. The optional capacitor 365 could be used in examples where it is desirable to limit the maximum current flowing through low voltage capacitor $C_{LV}$ 125 during the initial charging of low voltage capacitor $C_{LV}$ 125, often referred to as in-rush current. By limiting the rate of change of voltage across variable impedance element 355, the current flowing in low voltage capacitor $C_{LV}$ 125 is limited.

Figure 4:
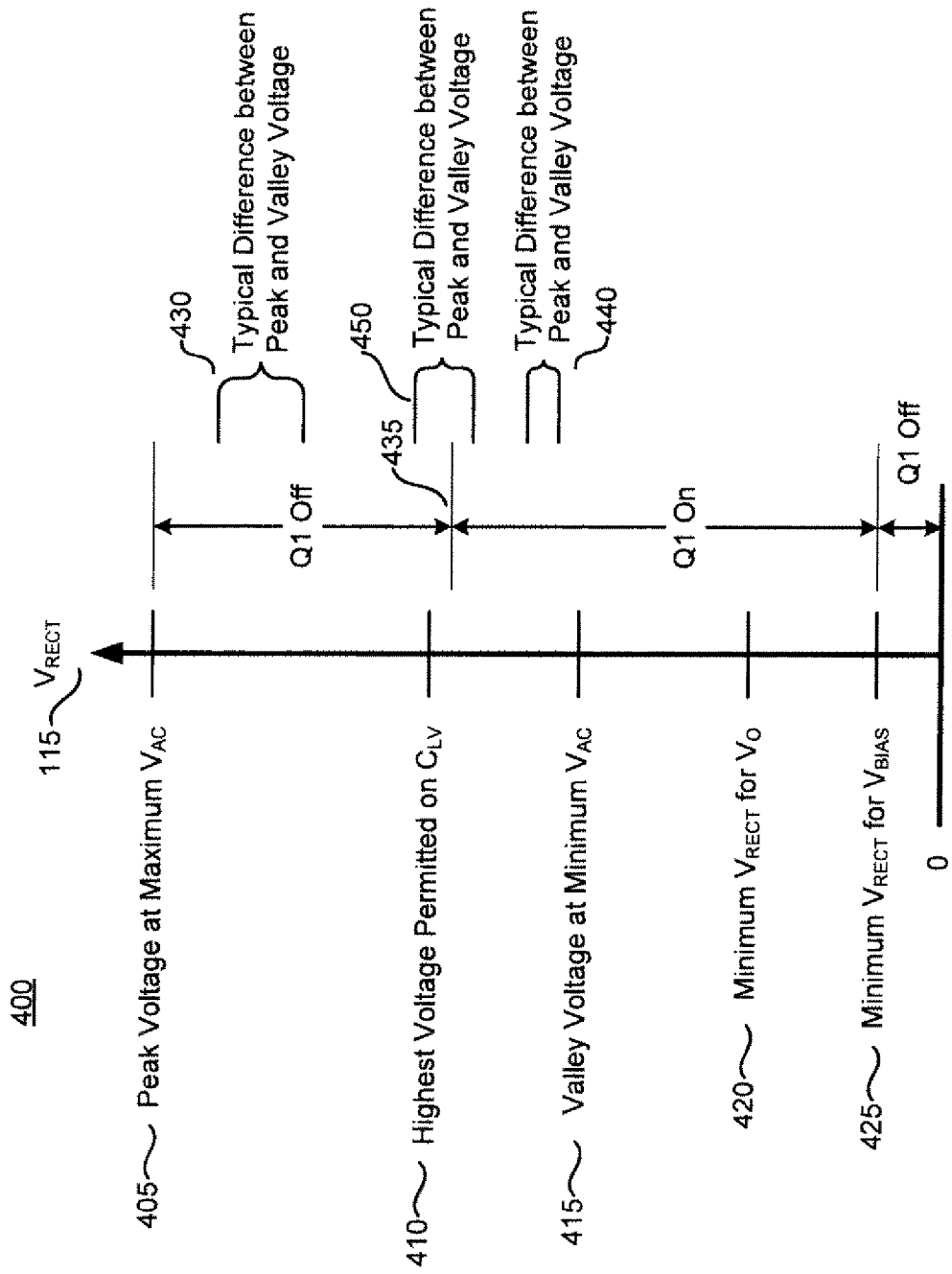
FIG. 4 shows a scale of the rectified voltage levels in an example power supply with corresponding states of a variable impedance element in the energy storage circuit of the example power supply in accordance with the teachings of the present invention.

FIG. 4 shows a scale of the rectified voltage levels in an example power supply with corresponding states of a variable impedance element in the energy storage circuit of the example power supply in accordance with the teachings of the present invention. In particular, the example illustration 400 of FIG. 4 shows the state of the transistor Q1 355 and the ripple voltage on the bulk capacitance of the power supply 300 in FIG. 3 for several values of the rectified voltage $V_{RECT}$ 115. The transistor Q1 355 is off when the rectified voltage $V_{RECT}$ is between zero volts and the minimum value 425 for the DC-to-DC converter 135 to produce sufficient bias voltage $V_{BIAS}$ 325. The transistor Q1 355 is on when the rectified voltage $V_{RECT}$ 115 is between the minimum value 425 and the threshold value 435. In the example, the threshold value 435 is set to be slightly less than the rated voltage 410 of the low voltage capacitance $C_{LV}$ 125. The transistor Q1 355 is off when the rectified voltage $V_{RECT}$ 115 is greater than the threshold voltage 435. The voltage rating of the high voltage capacitance $C_{HV}$ 120 is chosen to be greater than the value 405 of the rectified voltage $V_{RECT}$ 115 at the maximum expected single phase AC input voltage $V_{AC}$ 105.

FIG. 4 also shows the typical ripple voltages 430 and 440 for when the transistor Q1 335 is off and on, respectively. In one example 450, the peak of the rectified voltage $V_{RECT}$ 115 is above the threshold 435 and the valley of the rectified voltage $V_{RECT}$ 115 is below the threshold 435 when the single phase AC input voltage 115 is at a typical value so that the transistor Q1 355 turns on and off at the frequency of the ripple voltage.

In one example, the value of the high voltage capacitance $C_{HV}$ 120 is chosen to satisfy the minimum requirements of the DC-to-DC converter 135 at high AC input voltages. The value of the low voltage capacitance $C_{LV}$ 125 is chosen to keep the valley of the rectified voltage $V_{RECT}$ 115 above the minimum value 420 for the DC-to-DC converter 135 to provide the required output voltage $V_O$ 140 under all specified operating conditions of DC-to-DC converter 135. The capacitance in the energy storage circuit must contain enough energy to sustain the holdup time when the rectified voltage $V_{RECT}$ 115 is at the value 415. The value 415 corresponds to the valley voltage at the minimum single phase AC input voltage 105 where the power supply is specified to operate.

Figure 5:
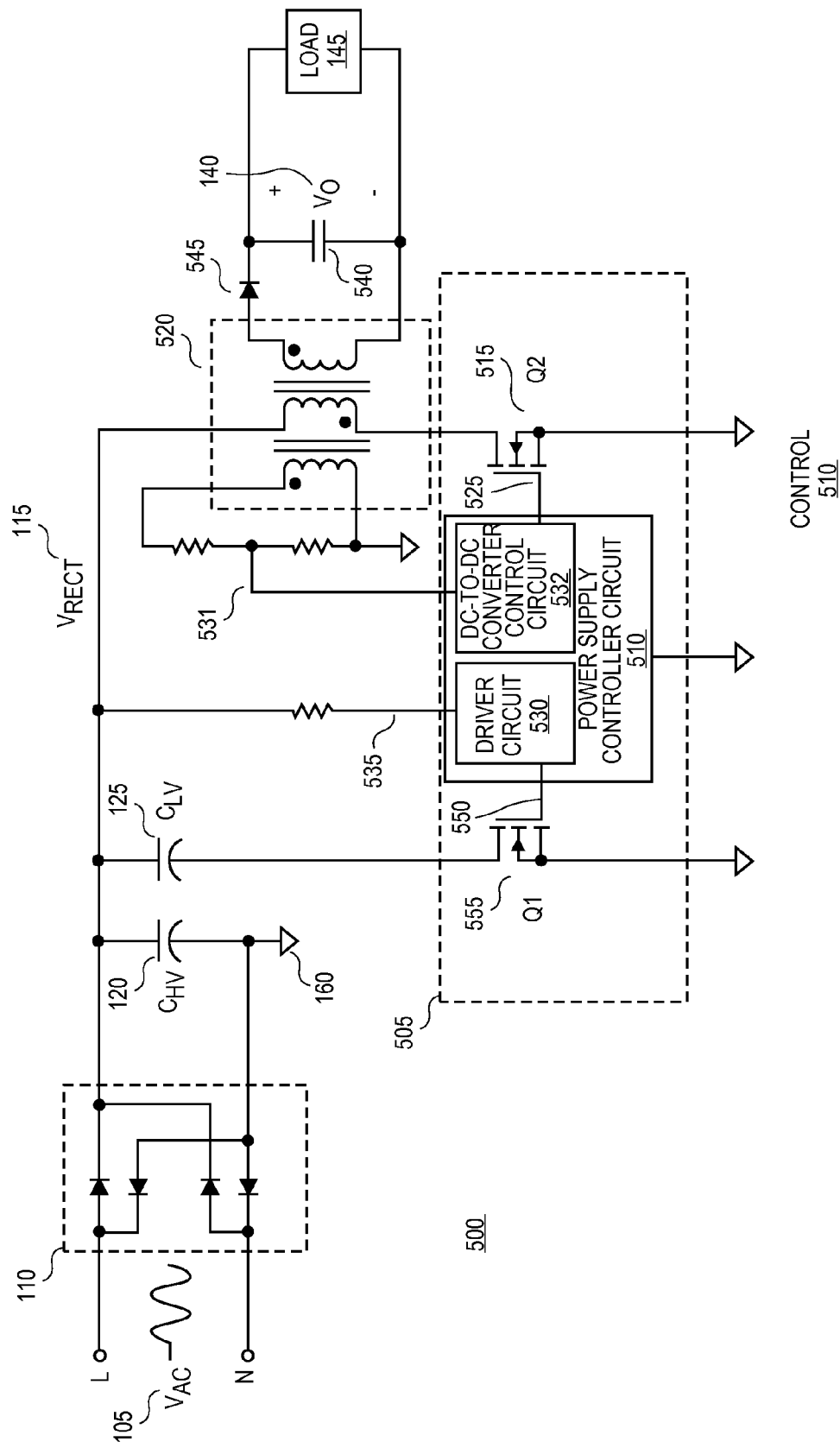
FIG. 5 illustrates an example AC-to-DC power supply with an integrated circuit that includes elements of an energy storage circuit with elements of an example DC-DC converter in accordance with the teachings of the present invention.

FIG. 5 illustrates an example AC-to-DC power supply 500 with a variable impedance element 555 for an energy storage circuit, a variable impedance element 515 for a DC-to-DC converter, and a power supply controller circuit 510 included in an integrated circuit 505. In the example, power supply controller circuit 510 comprises a driver circuit 530 and a DC-to-DC converter control circuit 532. In one example, driver circuit 530 is similar in function to driver circuits 130 and 330 and may include similar features. As shown, a transistor Q1 555 is the variable impedance element that engages and disengages the low voltage capacitance $C_{LV}$ 125 of the energy storage circuit in response to a drive signal 550 from driver circuit 530. In one example, DC-to-DC converter control circuit 532 is coupled to switch a transistor Q2 515 in response to a feedback signal 531 to control a transfer of energy to load 145 at an output of the power supply. Transistor Q2 515 is the variable impedance element that switches a first winding of the transformer 520 of a DC-to-DC converter, which in the depicted example is illustrated as a flyback converter, in response to a drive signal 525 from DC-to-DC converter control circuit 532. A diode 545 and a capacitor 540 are coupled to a second winding of the transformer 520 to deliver an output voltage $V_O$ 140 to a load 145.

As shown in the depicted example, power supply controller circuit 510 receives an input voltage signal 535 from the rectified voltage $V_{RECT}$ 115 and feedback signal 531 from a third winding of the transformer 520. The power supply controller circuit 510 provides a first drive signal 550 for the transistor Q1 555 to engage and to disengage the low voltage capacitance $C_{LV}$ 125 of the energy storage circuit. The power supply controller circuit 510 also provides a second drive signal 525 that switches the transistor Q2 515 on and off to regulate the output voltage $V_O$ 140 in response to the feedback signal 531. In another example, the feedback signal 531 is received from an optocoupler instead of from a winding of the transformer 520. In one example, input voltage signal 535 is coupled within power supply controller circuit 510 to drive circuit 530 and to DC-to-DC converter control circuit 532. In one example coupling input voltage signal 535 to driver circuit 530 provides a signal for a voltage sensor circuit internal to driver circuit 530 similar in function to element 134 in FIGS. 1 and 2. In one example coupling input voltage signal 535 to DC-to-DC converter control circuit 532 provides a feed-forward signal that may for example be employed to reduce a maximum current flowing through Q2 515 as input voltage 105 increases. In one example feedback signal 531 is coupled within power supply controller circuit 510 to driver circuit 530 and to DC-to-DC converter control circuit 32. In one example coupling feedback signal 531 to driver circuit 530 allows drive signal 550 to be held low in the event of a fault condition arising where the feedback signal 531 is lost. In the illustrated example, these internal connections and a plurality of other connections between driver circuit 530 and DC-to-DC converter control circuit 532 are not shown so as not to obscure the teachings of the present invention.

Figure 6:
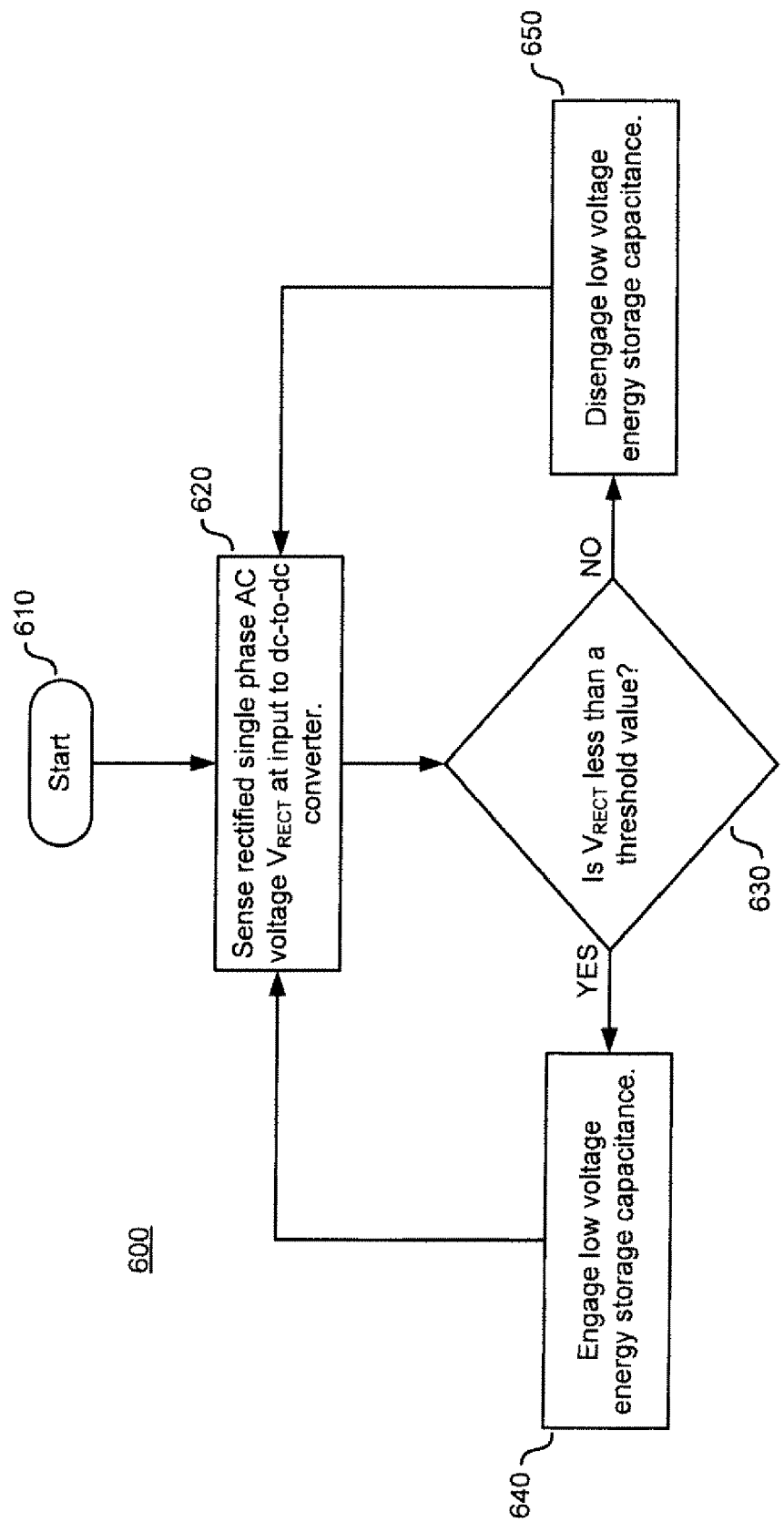
FIG. 6 is a flow diagram for an example method of energy storage in an example AC-to-DC power supply in accordance with the teachings of the present invention.

FIG. 6 is a flow diagram 600 for an example method of energy storage in an example AC-to-DC power supply in accordance with the teachings of the present invention. After starting in block 610 as shown, the rectified single phase AC voltage is sensed at the input to a DC-to-DC converter in block 620. The rectified voltage is compared to a threshold in block 630. If the rectified voltage is less than the threshold value, then in block 640 the low voltage capacitance is engaged in the energy storage circuit to receive current. If the rectified voltage is not less than the threshold value, then in block 650 the low voltage capacitance in the energy storage circuit is disengaged from receiving current. The sensing of the rectified voltage at the input to the DC-to-DC converter continues in block 620.

It is appreciated that although in the illustrated examples a full wave bridge rectification circuit 110 is used, a half wave rectification circuit could be employed while still benefiting from the teachings of the present invention. It is further understood that the benefits of the present invention are obtained without requiring any inductive circuit elements in energy storage circuit 165.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A driver circuit for use in a power supply having a rectifier coupled to generate a rectified voltage in response to a single phase AC voltage at an input of the power supply, the driver circuit comprising:

a drive signal generator to generate a drive signal to be coupled to a variable impedance element, the variable impedance element to be coupled to a low voltage capacitance and to a high voltage capacitance; and a voltage sensor coupled to the drive signal generator and to be coupled to sense a voltage across the high voltage capacitance, wherein the drive circuit is to be coupled to control the variable impedance element in response to the voltage sensor such that both the low voltage capacitance and the high voltage capacitance are allowed to receive current from the input of the power supply if the voltage across the high voltage capacitance is less than a second threshold value and the low voltage capacitance is prevented from receiving current from the input of the power supply if the voltage across the high voltage capacitance is greater than a first threshold value.

2. The driver circuit of claim 1 wherein the first threshold voltage and the second threshold voltage are substantially equal.

3. The driver circuit of claim 1 wherein the variable impedance element comprises a transistor.

4. The driver circuit of claim 1 wherein the voltage across the high voltage capacitance is coupled to an input of a DC-to-DC converter.

5. The driver circuit of claim 1 wherein the variable impedance element and the driver circuit are included in an integrated circuit.

6. The driver circuit of claim 1 wherein the variable impedance element and the driver circuit are included with a DC-to-DC converter control circuit in an integrated circuit.

7. The driver circuit of claim 1 wherein the driver circuit is further responsive to a rate of change of voltage across the variable impedance element.

8. The driver circuit of claim 1 wherein the ratio of a voltage rating of the high voltage capacitance and the low voltage capacitance is equal to or greater than 2:1.

9. A method to control a power supply operating from a rectified single phase AC input voltage, comprising:

sensing a voltage at an input to a DC-to-DC converter of the power supply;

engaging both a low voltage capacitance and a high voltage capacitance coupled to an input of the power supply if the sensed voltage is less than a second threshold value; and disengaging the low voltage capacitance if the sensed voltage is greater than a first threshold value.

10. The method of claim 9 wherein the first and second threshold values are substantially equal.

11. The method of claim 9 wherein engaging both the low voltage capacitance and the high voltage capacitance comprises allowing both the low voltage capacitance and the high voltage capacitance to receive current from the input of the power supply.

12. The method of claim 9 wherein disengaging the low voltage capacitance of the energy storage circuit comprises preventing the low voltage capacitance from receiving current from the input of the power supply.

13. A power supply, comprising:
   a rectifier coupled to receive a single phase AC input voltage;
   an energy storage circuit coupled to the rectifier, the energy storage circuit including a high voltage capacitance, a low voltage capacitance and a variable impedance element, wherein a current received from the rectifier is coupled to produce a voltage across the high voltage capacitance, wherein the low voltage capacitance is coupled to the high voltage capacitance, wherein the variable impedance element is coupled to the low voltage capacitance and the high voltage capacitance; and
   a driver circuit coupled to generate a drive signal in response to the voltage across the high voltage capacitance, wherein the drive signal is coupled to be received by the variable impedance element to prevent the low voltage capacitance from receiving current from the rectifier when the voltage across the high voltage capacitance is greater than a first threshold voltage and to allow both the low voltage capacitance and the high voltage capacitance to receive current from the rectifier when the voltage across the high voltage capacitance is less than a second threshold voltage.

14. The power supply of claim 13 wherein the first threshold voltage and the second threshold voltage are substantially equal.

15. The power supply of claim 13 wherein the variable impedance element comprises a transistor.

16. The power supply of claim 13 wherein the variable impedance element further comprises a diode coupled to the low voltage capacitance and the high voltage capacitance.

17. The power supply of claim 13 wherein the driver circuit comprises a shunt regulator coupled to generate the drive signal to be received by the variable impedance element in response to the rectified voltage.

18. The power supply of claim 13 wherein the rectified voltage is coupled to an input to a DC-to-DC converter.

19. The power supply of claim 13 wherein the variable impedance element and the driver circuit are included in an integrated circuit.

20. The power supply of claim 13 wherein the variable impedance element and the driver circuit are included with a DC-to-DC converter control circuit in an integrated circuit.

21. The power supply of claim 13 wherein the driver circuit is coupled to generate a drive signal in response to a rate of change of voltage across the variable impedance element.

22. The power supply of claim 13 wherein the ratio of a voltage rating of the high voltage capacitance and the low voltage capacitance is equal to or greater than 2:1.

23. A power supply controller circuit for use in a power supply having a rectifier coupled to generate a rectified voltage in response to a single phase AC voltage at an input of the power supply, the power supply controller circuit comprising:
   a DC-to-DC converter controller circuit to be coupled to switch a first variable impedance element to control a transfer of energy to an output of the power supply; and
   a driver circuit comprising:
      a drive signal generator to generate a drive signal to be coupled to a second variable impedance element, the second variable impedance element to be coupled to a low voltage capacitance and to a high voltage capacitance; and
      a voltage sensor coupled to the drive signal generator and to be coupled to sense a voltage across the high voltage capacitance, wherein the drive circuit is to be coupled to control the second variable impedance element in response to the voltage sensor such that both the low voltage capacitance and the high voltage capacitance are allowed to receive current from the input of the power supply if the voltage across the high voltage capacitance is less than a second threshold value and the low voltage capacitance is prevented from receiving current from the input of the power supply if the voltage across the high voltage capacitance is greater than a first threshold value.

24. The power supply controller circuit of claim 23 wherein the first and second variable impedance elements, the DC-to-DC converter controller circuit and the driver circuit are included in an integrated circuit.

25. The power supply controller circuit of claim 23 wherein the ratio of a voltage rating of the high voltage capacitance and the low voltage capacitance is equal to or greater than 2:1.

* * * * *